United States Patent
Morrison et al.

(10) Patent No.: US 10,031,557 B1
(45) Date of Patent: Jul. 24, 2018

(54) HYBRID THERMAL FOOT AND PEN STORAGE WELL

(71) Applicant: Dell Products, L.P., Round Rock, TX (US)

(72) Inventors: John Trevor Morrison, Round Rock, TX (US); Travis North, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/415,825

(22) Filed: Jan. 25, 2017

(51) Int. Cl.
- *G06F 1/16* (2006.01)
- *G06F 1/20* (2006.01)
- *G06F 1/18* (2006.01)
- *G06F 3/0354* (2013.01)

(52) U.S. Cl.
CPC .......... *G06F 1/1656* (2013.01); *G06F 1/1616* (2013.01); *G06F 1/1643* (2013.01); *G06F 1/189* (2013.01); *G06F 1/203* (2013.01); *G06F 3/03545* (2013.01); *G06F 2200/1632* (2013.01)

(58) Field of Classification Search
CPC .............................. G06F 1/203; G06F 3/03545
See application file for complete search history.

(56) References Cited

U.S. PATENT DOCUMENTS

| | | | | |
|---|---|---|---|---|
| 5,067,573 A | * | 11/1991 | Uchida | G06F 1/1626 345/173 |
| 5,537,343 A | * | 7/1996 | Kikinis | G06F 1/1626 361/679.41 |
| 5,657,459 A | * | 8/1997 | Yanagisawa | G06F 1/1632 345/169 |
| 5,694,294 A | * | 12/1997 | Ohashi | G06F 1/203 361/679.48 |
| 5,703,626 A | * | 12/1997 | Itoh | G06F 1/1626 178/19.01 |
| 5,750,939 A | * | 5/1998 | Makinwa | G06F 3/03545 178/18.01 |
| 5,796,575 A | * | 8/1998 | Podwalny | G06F 1/1626 361/679.27 |
| 5,973,677 A | * | 10/1999 | Gibbons | G06F 1/1626 178/18.04 |
| 6,068,307 A | * | 5/2000 | Murphy | G06F 1/1616 292/300 |
| 6,104,607 A | * | 8/2000 | Behl | G06F 1/203 165/80.3 |

(Continued)

*Primary Examiner* — Adrian S Wilson
(74) *Attorney, Agent, or Firm* — Fogarty LLP

(57) ABSTRACT

Embodiments provide the ability to store a pen device within an integrated docking compartment of an IHS (Information Handling System) that utilizes a touch-sensitive display, such as certain laptops and tablet devices. The pen device is stored within a docking compartment provided partially within a cooling structure that protrudes from the bottom of the enclosure of the IHS, thus creating an air gap below the IHS that allows heated air to be vented from underneath the IHS. The docking compartment may include charging contacts that interface with charging contacts on the pen device when docked in order to charge internal batteries that power sensors integrated into the pen device. By integrating the docking compartment into the cooling structure, a pen device may be protected from damage and loss while still supporting the thin applications.

20 Claims, 9 Drawing Sheets

(56) References Cited

U.S. PATENT DOCUMENTS

| | | | | |
|---|---|---|---|---|
| 6,532,152 B1* | 3/2003 | White | G02F 1/133308 | 312/223.1 |
| 6,560,092 B2* | 5/2003 | Itou | G06F 1/1626 | 108/43 |
| 7,012,806 B2* | 3/2006 | Jones | G06F 1/1616 | 165/104.11 |
| 7,558,062 B2* | 7/2009 | Wang | G06F 1/203 | 165/185 |
| 7,564,681 B2* | 7/2009 | Chen | G06F 1/20 | 165/80.3 |
| 8,737,049 B2* | 5/2014 | Minaguchi | G06F 1/1616 | 345/179 |
| 9,134,757 B2* | 9/2015 | Nishi | G06F 1/203 | |
| 9,268,377 B2* | 2/2016 | MacDonald | G06F 1/1681 | |
| 9,395,753 B2* | 7/2016 | Amano | G06F 1/1626 | |
| 2002/0101411 A1* | 8/2002 | Chang | G06F 1/1626 | 345/179 |
| 2002/0190823 A1* | 12/2002 | Yap | G06F 1/1616 | 335/205 |
| 2003/0076302 A1* | 4/2003 | Langstraat | G06F 1/1626 | 345/161 |
| 2005/0105273 A1* | 5/2005 | Tanaka | G06F 1/203 | 361/699 |
| 2005/0275623 A1* | 12/2005 | Chadha | G06F 3/0312 | 345/156 |
| 2006/0044288 A1* | 3/2006 | Nakamura | G06F 1/1626 | 345/179 |
| 2006/0114653 A1* | 6/2006 | Seto | G06F 1/203 | 361/695 |
| 2008/0005423 A1* | 1/2008 | Jacobs | A61B 5/0002 | 710/62 |
| 2008/0212278 A1* | 9/2008 | DeLuga | G06F 1/1632 | 361/690 |
| 2009/0002941 A1* | 1/2009 | Mongia | G06F 1/20 | 361/690 |
| 2009/0201639 A1* | 8/2009 | Wang | G06F 1/203 | 361/679.54 |
| 2009/0219684 A1* | 9/2009 | Mori | G06F 1/1626 | 361/679.56 |
| 2009/0237377 A1* | 9/2009 | Lai | G06F 1/1632 | 345/179 |
| 2010/0007251 A1* | 1/2010 | Hsu | G06F 1/1601 | 312/223.1 |
| 2010/0165567 A1* | 7/2010 | Shih | G06F 1/1616 | 361/679.48 |
| 2011/0292592 A1* | 12/2011 | Senatori | G06F 1/203 | 361/679.46 |
| 2012/0013781 A1* | 1/2012 | Yamagiwa | G06F 1/1626 | 348/333.01 |
| 2012/0113593 A1* | 5/2012 | Hsu | G06F 1/203 | 361/696 |
| 2012/0127652 A1* | 5/2012 | Lin | G06F 1/203 | 361/679.46 |
| 2012/0327581 A1* | 12/2012 | Pais | G06F 1/1632 | 361/679.26 |
| 2013/0003284 A1* | 1/2013 | Massaro | G06F 1/166 | 361/679.28 |
| 2013/0335903 A1* | 12/2013 | Raken | G06F 1/1613 | 361/679.4 |
| 2014/0049894 A1* | 2/2014 | Rihn | G06F 1/1616 | 361/679.27 |
| 2014/0160659 A1* | 6/2014 | Massaro | G06F 1/203 | 361/679.27 |
| 2017/0060201 A1* | 3/2017 | Prather | G06F 1/203 | |

* cited by examiner

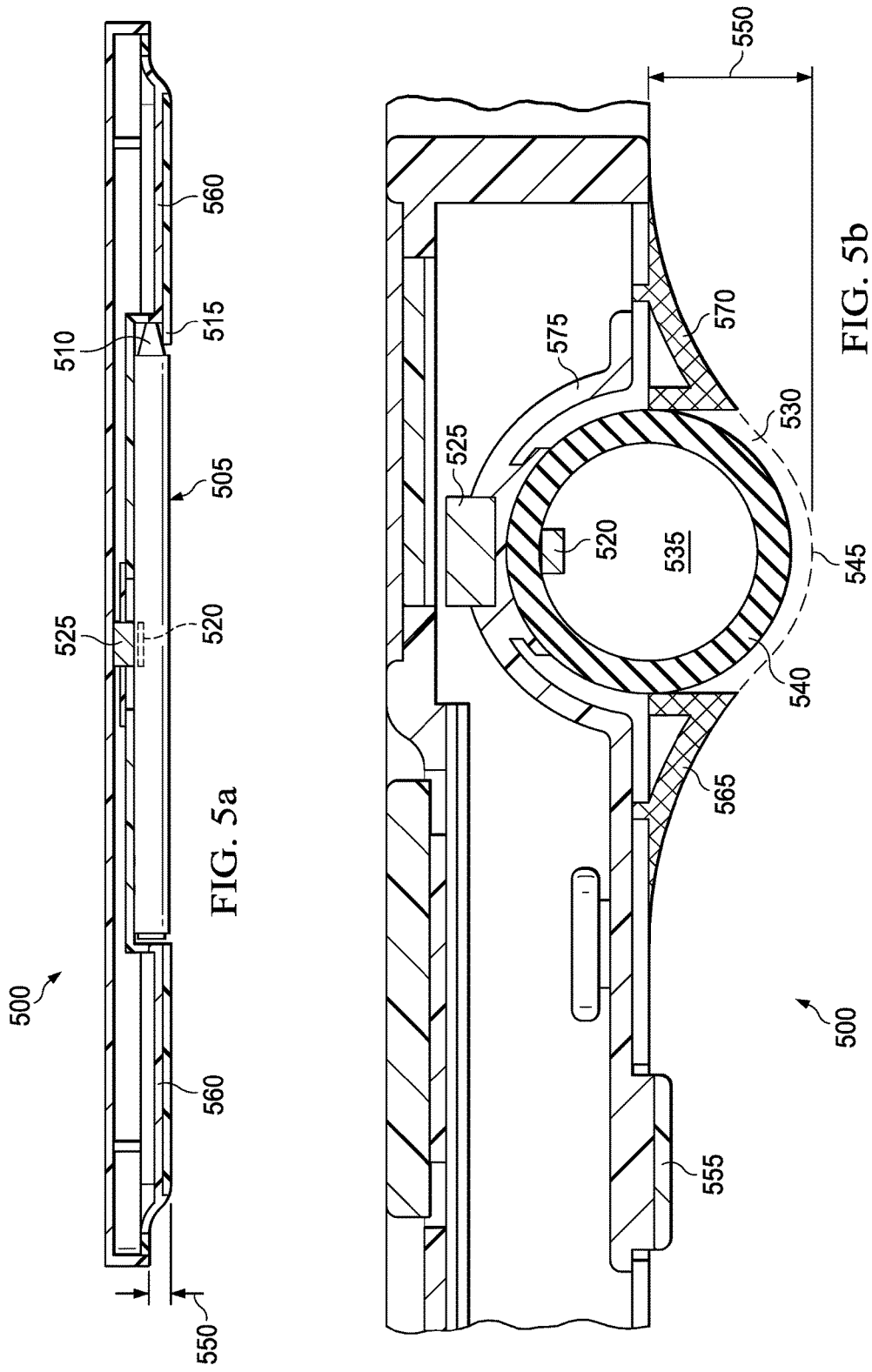

HYBRID THERMAL FOOT AND PEN STORAGE WELL

FIELD

This disclosure relates generally to storage of a stylus used by an Information Handling System (IHS), and more specifically, to docking of a pen device used by an IHS.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Traditionally, input mechanisms for IHS were limited mostly to keyboards and mice. More recently, IHSs have evolved to include new forms of user inputs, such as speech and touch. The use of touch inputs have become increasingly common with the proliferation of smart phones and tables. Touch inputs typically utilize touch sensitive display screens that may receive input from the user in the form of finger gestures or through the use of a stylus. The use of pen devices has become increasingly common, especially as tablets have improved and become adopted for more uses. In addition to functioning as a traditional stylus, modern pen devices may include sensors that capture data that is transmitted to the IHS in order to aid in providing the user with a natural writing experience.

One challenge to the use of such pens as input devices is their ease in getting lost and damaged, similar to traditional writing tools. For IHSs with touch sensitive displays, it is desirable for the IHS to include an ability to safeguard a pen device for use with the display. An IHS has some form of enclosure that encases the electronic components. Certain IHSs with touch-sensitive displays, such as tablets and certain laptops, are enclosed within a hard shell suitable for transport and mobile use. Attaching a pen external to this enclosure leaves the pen susceptible to damage and loss. Pen storage that is integral to the enclosure of the IHS better safeguards the pen. Storage of a pen integral to the enclosure of an IHS is increasingly limited by the continually decreasing thickness of mobile devices.

One aspect of the enclosure of an IHS is the enclosure's ability to facilitate the cooling of the internal components of the IHS. Most notably, the enclosure must allow sufficient airflow that allows the IHS to vent heated air away from the internal electronic components of the IHS, such as the processor. In certain IHSs that are enclosed within a hard case, cooling may be promoted by using structures that elevate the body of the hard case, allowing air to be vented from underneath the IHS.

SUMMARY

Embodiments described herein provide a system including a pen device and an IHS enclosure comprising a cooling structure that protrudes from the bottom of the enclosure and supports venting heated air from underneath the IHS, wherein the cooling structure comprises a cavity that includes a compartment for docking the pen device.

In certain embodiments of the system, the pen device comprises a battery and further comprises one or more sensors that are powered by the battery. In certain embodiments of the system, the pen docking compartment includes one or more charging contacts that interface with corresponding charging contacts on the surface of the pen device in order to charge the battery. In certain embodiments of the system, the pen device is approximately 9.5 mm in diameter. In certain embodiments of the system, the advertised thickness of the IHS is less than or equal to 11 mm. In certain embodiments of the system, the pen device is secured within the pen docking compartment via a magnet coupling. In certain embodiments of the system, magnet coupling is generated by a magnet located within the pen device and a metal slug located within the pen docking compartment. In certain embodiments of the system, the cooling structure maintains an air gap underneath the IHS. In certain embodiments of the system, the cooling structure obscures a portion of the pen docking compartment such that the tip of the pen device is covered when docked in the pen docking compartment.

Additional embodiments described herein provide a system including an IHS enclosure comprising a cooling structure that protrudes from the bottom of enclosure and supports venting heated air from underneath the IHS, wherein the cooling structure comprises a cavity that includes a compartment for docking a pen device.

In certain embodiments of the IHS enclosure system, the pen device comprises a battery and wherein the pen docking compartment includes one or more charging contacts that interface with corresponding charging contacts on the surface of the pen device in order to charge the battery. In certain embodiments of the IHS enclosure system, the pen device is approximately 9.5 mm in diameter and wherein the advertised thickness of the IHS is less than or equal to 11 mm. In certain embodiments of the IHS enclosure system, the pen device is secured within the pen docking compartment via a magnet coupling generated by a magnet located within the pen device and a metal slug located within the pen docking compartment. In certain embodiments of the IHS enclosure system, the cooling structure maintains an air gap underneath the IHS. In certain embodiments of the IHS enclosure system, the cooling structure obscures a portion of the pen docking compartment such that the tip of the pen device is covered when docked in the pen docking compartment.

Additional embodiments described herein provide a pen device include a battery; one or more sensors powered by the battery; one or more charging contacts on the surface of the pen device, wherein the charging contacts interface with corresponding charging contacts provided within a cavity of a cooling structure that protrudes from the bottom of the enclosure of an IHS, wherein the cavity comprises a compartment for docking the pen device.

In certain embodiments, the pen device is approximately 9.5 mm in diameter. In certain embodiments of the pen device, the advertised thickness of the IHS is less than or equal to 11 mm. In certain embodiments, the pen device further includes a magnet for magnetically coupling the pen device within the pen docking compartment. In certain embodiments of the pen device, the magnet coupling is generated between the magnet located within the pen device and a metal slug located within the pen docking compartment.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 2b is an illustration of the bottom side of the IHS of FIG. 2a.

FIG. 5a is a cutaway illustration of an integrated pen device storage compartment and pen device according to various embodiments.

FIG. 5b is another cutaway illustration of an integrated pen device storage compartment and pen device according to various embodiments.

FIG. 7b is an illustration of the bottom of the IHS of FIG. 7a.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Figure 1:
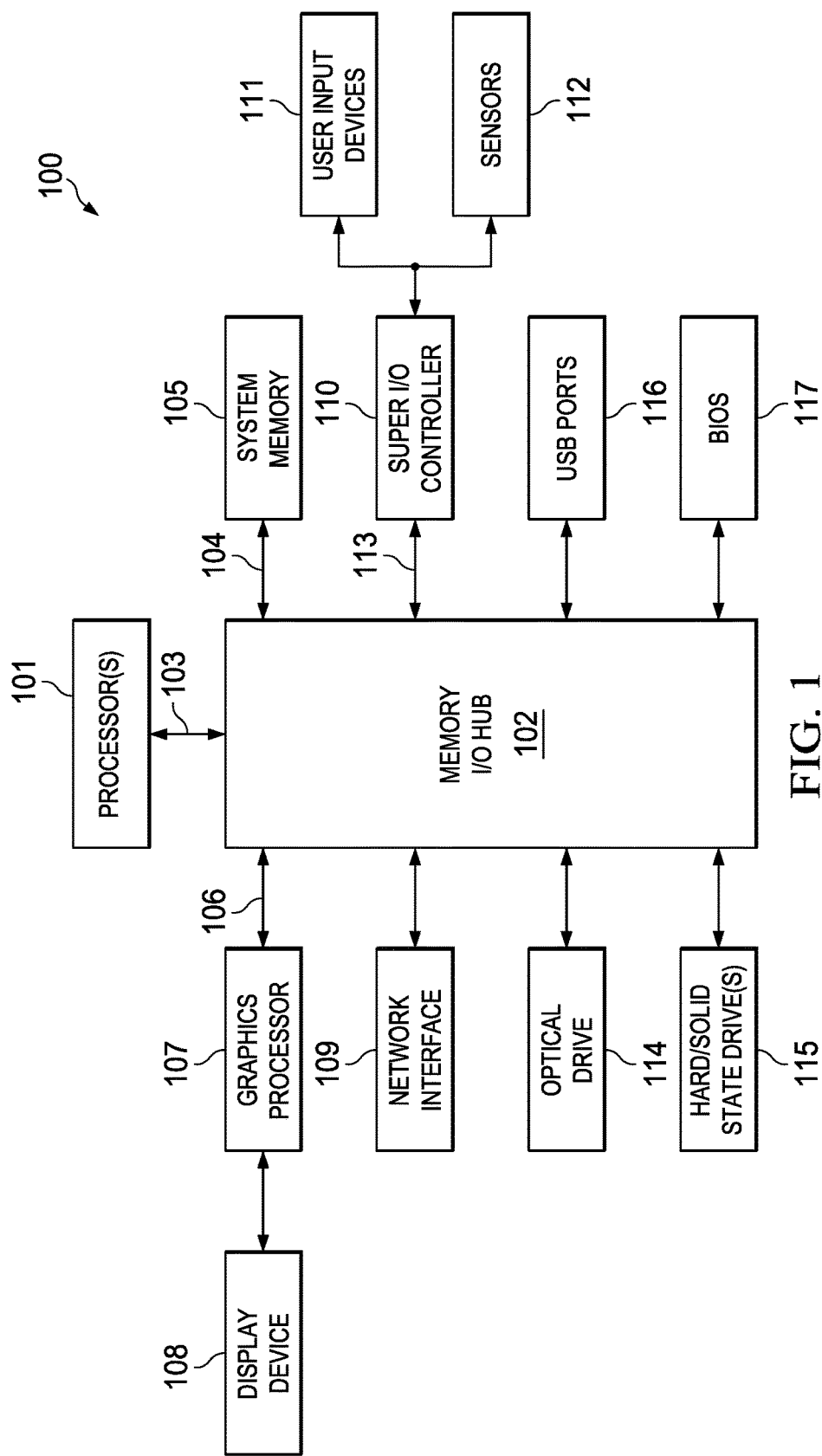
FIG. 1 is a block diagram depicting certain components of an IHS configured according to various embodiments for use with a touch-sensitive display and pen device inputs.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows various internal components of an example IHS configured to implement the provided embodiments. It should be appreciated that although certain embodiments described herein may be discussed in the context of a laptop or tablet computing device with a touch-sensitive display, other embodiments may be utilized with various other types of computing devices.

FIG. 1 is a block diagram of an IHS 100 configured according to certain embodiments to provide an integrated pen device storage and charging compartment according to various embodiments. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a chipset 102 that may include one or more integrated circuits that are connect to processor(s) 101. In certain embodiments, the chipset 102 may utilize a QPI (QuickPath Interconnect) bus 103 for communicating with the processor(s) 101. Chipset 102 provides the processor(s) 101 with access to a variety of resources. For instance, chipset 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), synchronous dynamic RAM (SDRAM), nonvolatile/Flash-type memory, or any other type of memory.

Chipset 102 may also provide access to a graphics processor 107. In certain embodiments, graphics processor 107 may be comprised within one or more video or graphics cards that have been installed as components of the IHS 100. Graphics processor 107 may be coupled to the chipset 102 via a graphics bus 106 such as provided by an AGP (Accelerated Graphics Port) bus, a PCIe (Peripheral Component Interconnect Express) bus. In certain embodiments, a graphics processor 107 generates display signals and provides them to a display device 108. In many embodiments, the display device 108 is integrated into the IHS in the form of a laptop or tablet computer that includes a touch-sensitive display.

In certain embodiments, chipset 102 may also provide access to one or more user input devices 111. In such embodiments, chipset 102 may be coupled to a super I/O controller 110 that provides interfaces for a variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communications with one or more sensor devices 112, which may include environment sensors, such as a temperature sensor or other cooling system sensors. The I/O devices, such as the user input devices 111 and the sensor devices 112, may interface super I/O controller 110 through wired or wireless connections. In certain embodiments, the super I/O controller 110 may be coupled to the super I/O controller 110 via a Low Pin Count (LPC) bus 113.

Other resources may also be coupled to the processor(s) 101 of the IHS 100 through the chipset 102. In certain embodiments, chipset 102 may be coupled to a network interface 109, such as is provided by a Network Interface Controller (NIC) that is coupled to the IHS 100. In certain embodiments, the network interface 109 may be coupled to the chipset 102 via a PCIe bus. According to various embodiments, network interface 109 may support communication via various wired and/or wireless networks. Chipset 102 may also provide access to one or more hard disk and/or solid state drives 115. In certain embodiments, the chipset 102 may also provide access to one or more optical drives 114 or other removable-media drives. Any or all of the drive devices 114 and 115 may be integral to the IHS 100, or may be located remotely from the IHS 100. In certain embodiments, the chipset 102 may also provide access to one or more Universal Serial Bus (USB) ports 116.

Another resource that may be accessed by processor(s) 101 via chipset 102 is a BIOS (Basic Input/Output System) 117. Upon booting of the IHS 100, processor(s) 101 may utilize BIOS 117 instructions to initialize and test hardware components coupled to the IHS 100 and to load an Operating System (OS) for use by the IHS 100. The BIOS 117 provides an abstraction layer that allows the operating system to interface with certain hardware components that are utilized by IHS 100. Via this hardware abstraction layer provided by BIOS 117, the software executed by the processor(s) 101 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
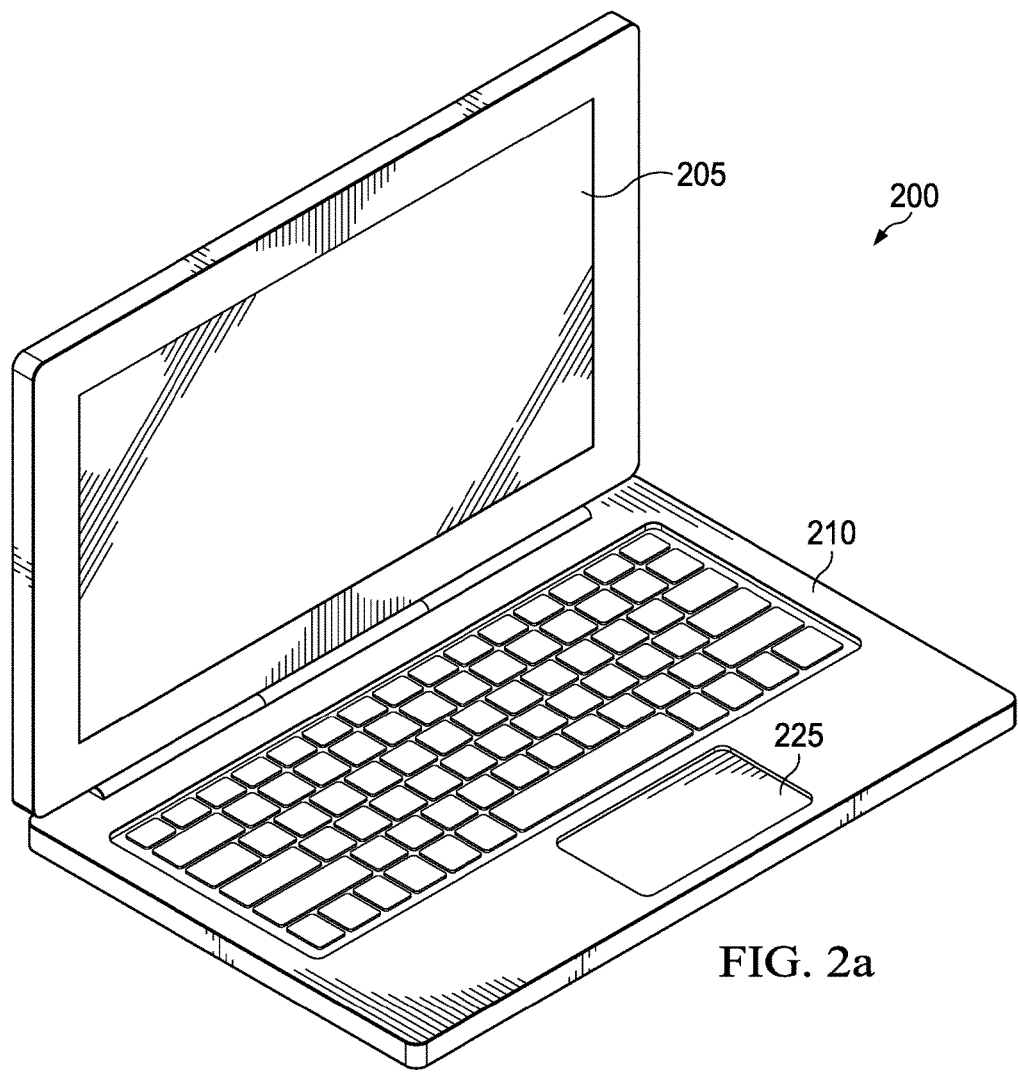
FIG. 2a is an illustration of an IHS with a touch-sensitive display according to certain embodiments.
Figure 2B:
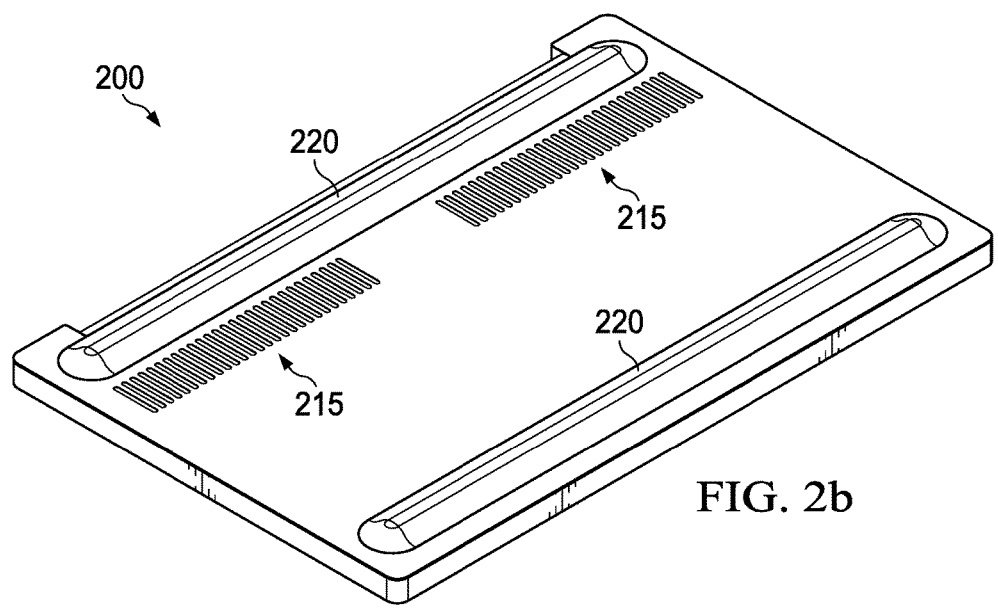

FIG. 2a is an illustration of an IHS 200 that includes a display 205 and a base 210, where the base 210 houses the hardware of the IHS 200 such as the motherboard, processor(s), storage drives, memory and various sub-systems utilized by the IHS. The base 210 may also include a touchpad 225 used for receiving finger gesture inputs. The IHS 200 illustrated in FIG. 2a-c is a laptop computer with a touch-sensitive display 205. The user may utilize finger inputs or a stylus to provide inputs via the touch-sensitive display 205. The IHS 200 may allow the touch-sensitive display 205 to be rotated into various positions relative to the base 210, such that the keyboard provided by the base 210 is not always used and the IHS 200 may operate similar to a tablet device using only the touch-sensitive display 205.

FIG. 2b is an illustration of the bottom of the IHS 200 of FIG. 2a. The illustrated IHS 200 includes two vents 215 on the bottom side of the enclosure of the IHS. Other IHSs may include different numbers and configurations of vents in the bottom of the enclosure. The vents 215 allow heated air to be vented from inside the base 210 and away from the internal electronic components of the IHS as part of the cooling procedures implemented by the IHS. Heated air may be forced though the vents 215 by one or more fans that are positioned inside the base 210 of the IHS. Heat sinks may also be used to direct heat towards the vents 215 one the bottom side of the IHS's enclosure.

As illustrated in FIG. 2b, the bottom side of the enclosure of IHS 200 includes two protuberances 220 that may each be referred to as a thermal foot. When IHS 200 is used on certain surfaces, the vents 215 may be greatly obstructed, thus resulting in undesirable and potentially damaging overheating of system components. When placed on a relatively flat surface, such as a desk or table, the thermal feet 220 that protrude from the base 210 raise the base 210 off of the surface in order to create an air gap beneath the IHS. The greater the height of the thermal feet 220 relative to the base 210, the greater the size of the created air gap. The thermal feet 220 are designed to create an air gap sufficient to allow heated air to escape from the vents 215 and out from underneath the IHS. In the IHS 200 of FIGS. 2a and 2b, each of the thermal feet 220 run along the length of base 210 in the direction of the rows of keys that comprise the keyboard. In other scenarios, the thermal feet 220 may be oriented differently along the bottom of the base 210 of the IHS 200. In certain scenarios, each of the thermal feet 220 may include anti-slip surfaces and/or coatings that reduce slipping of the IHS 200 when used on smooth, flat surfaces.

Figure 3A:
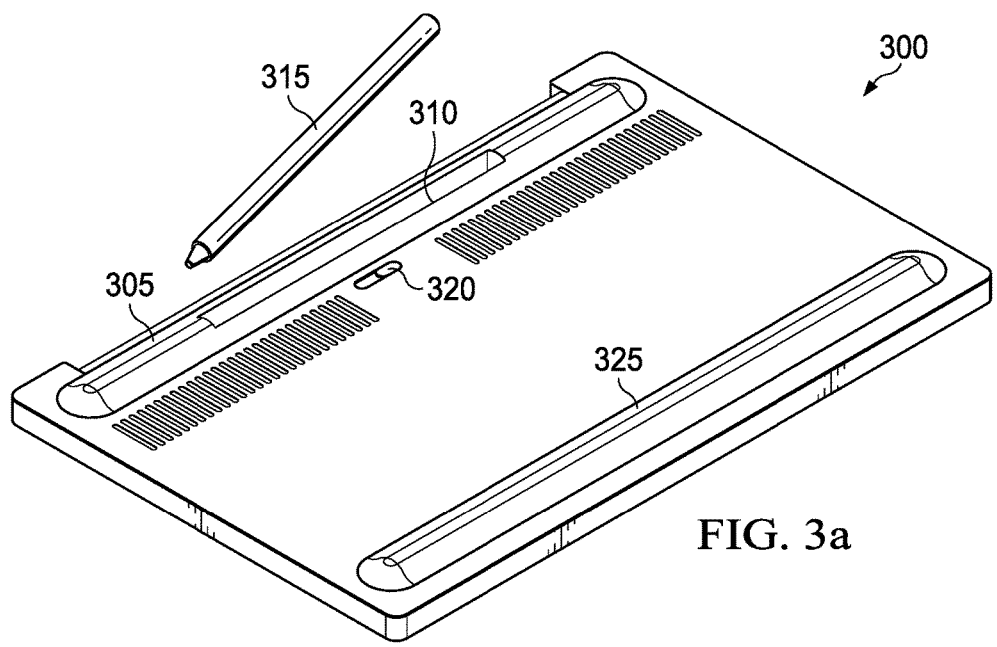
FIG. 3a is an illustration of the storage of a pen device in an integrated pen storage compartment according to certain embodiments.

FIG. 3a is an illustration of the bottom side of an IHS 300 that includes a pen docking compartment 310 according to various embodiments. In the illustrated embodiment, IHS 300 is a laptop computer with a touch-sensitive display similar to IHS 200 described with respect to FIGS. 2a and 2b. The IHS 300 includes a thermal foot 305 that runs along the length of the bottom of the base of the IHS. The IHS 300 includes a second thermal foot 325 that runs parallel to thermal foot 305 along the length of the bottom of the base. In certain embodiments, only a single thermal foot 305 may be present. In other embodiments, one of more thermal feet may be oriented differently on the base of the IHS from the thermal feet 305 and 325 illustrated with respect to IHS 300.

Thermal foot 305 of IHS 300 includes a portion that forms a pen docking compartment 310 according to various embodiments. The pen docking compartment 310 is formed within a cavity of thermal foot 305 such that the ability of the thermal foot 305 to facilitate cooling of the IHS 300 is not compromised. In various embodiments, the pen docking compartment 310 may be formed from greater or lesser portions of a thermal foot different from the thermal foot 305 in the illustrated IHS 300. For instance, in another embodiment similar to that illustrated in FIG. 3a, an IHS may be substantially smaller in size such that the cavity of the pen storage compartment runs a larger portion of the length of the thermal foot. Any portion of the thermal foot 305 may remain in addition to the portion dedicated to housing the pen docking compartment 310.

Figure 3B:
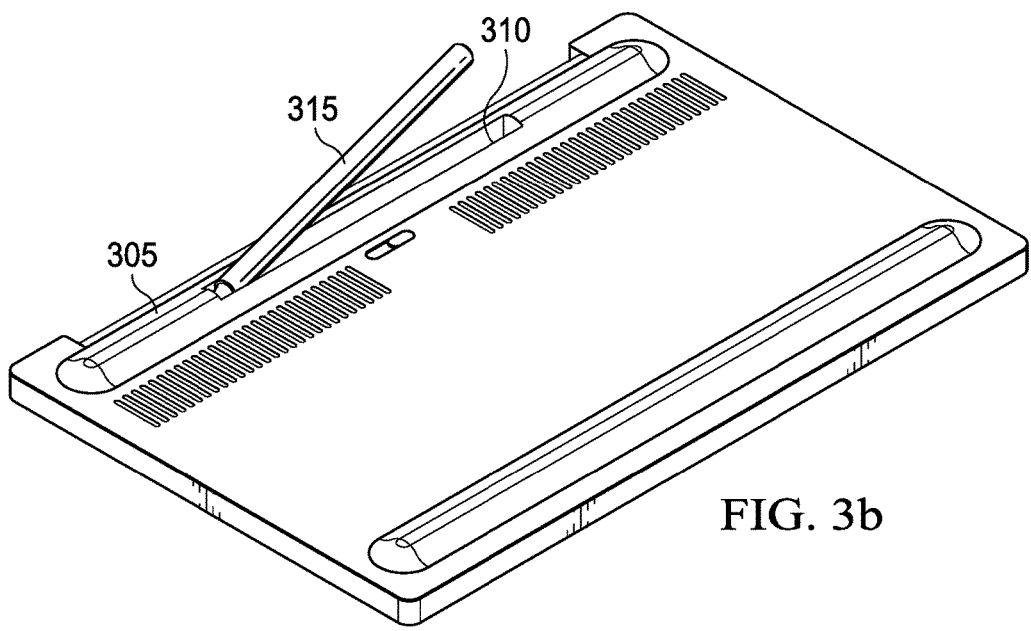
FIG. 3b is another illustration of the storage of a pen device in an integrated pen storage compartment according to certain embodiments.
Figure 3C:
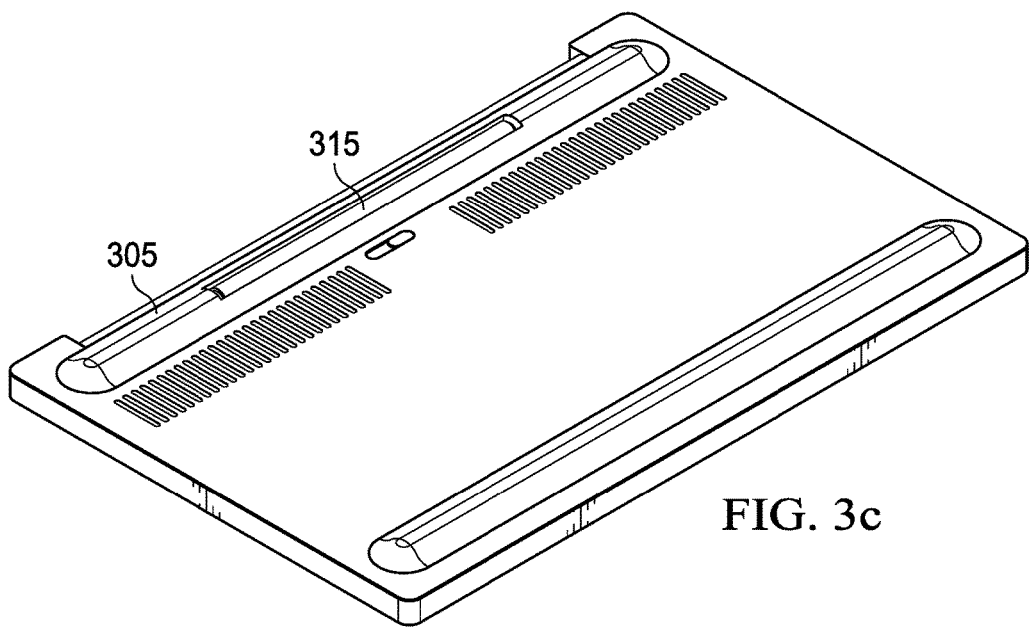
FIG. 3c is another illustration of the storage of a pen device in an integrated pen storage compartment according to certain embodiments.

As illustrated in FIGS. 3a-c, the pen device 315 may be inserted into the pen docking compartment 310 by the user. In FIG. 3b, the pen device 315 is partially docked in the pen docking compartment 310. In FIG. 3c, the pen device 315 is fully docked in the pen docking compartment 320. When fully docked, the pen device 315 is secured in the pen docking compartment 310. In certain embodiments, the pen device 315 is held securely in the pen docking compartment 310 using corresponding magnets integrated into the pen device 315 and the pen docking compartment 310. The IHS 330 illustrated in FIG. 3a also includes a latch 320 that is configured to allow a user to release and eject the pen device 315 from the pen docking compartment 310. Other embodiments may utilize two or more small rubber or other elastomer structures that deform to allow the pen device to be inserted into the pen docking compartment, but are stiff enough to assist in securing the docked pen device within the compartment.

As illustrated in FIG. 3c, once the pen device 315 is secured in the pen docking compartment 310, the pen device 315 is nested within the cavity provided within the thermal foot 310. In this docked position, the pen device 315 does not protrude as far as the thermal foot 305 such that the thermal foot 305 serves to keep the pen device 315 protected when the IHS 300 is placed on a smooth work surface. Docked in this manner, the pen device 315 is stored such that it does not protrude from the IHS 300 enclosure and is securely held in place within the pen docking compartment 310. By providing storage for pen device 315 within a compartment that is integrated within the enclosure of the IHS 300, the pen device 315 is less likely to get separated from the IHS 300 and thus less likely to get damaged or lost.

In FIGS. 3a-c, the illustrated embodiment IHS 300 is a laptop computer with a touch-sensitive display. In certain other embodiments, the IHS 300 may not include any keyboard and may be strictly a tablet device, in which case the pen docking compartment may be integrated into a thermal foot that is part of the enclosure of the tablet. In certain others embodiments, the keyboard used by the IHS may be detachable from the touch-sensitive display, in which case the pen storage enclosure may be integrated into a thermal foot provided on the back of the enclosure of the touch-sensitive display.

Figure 4:
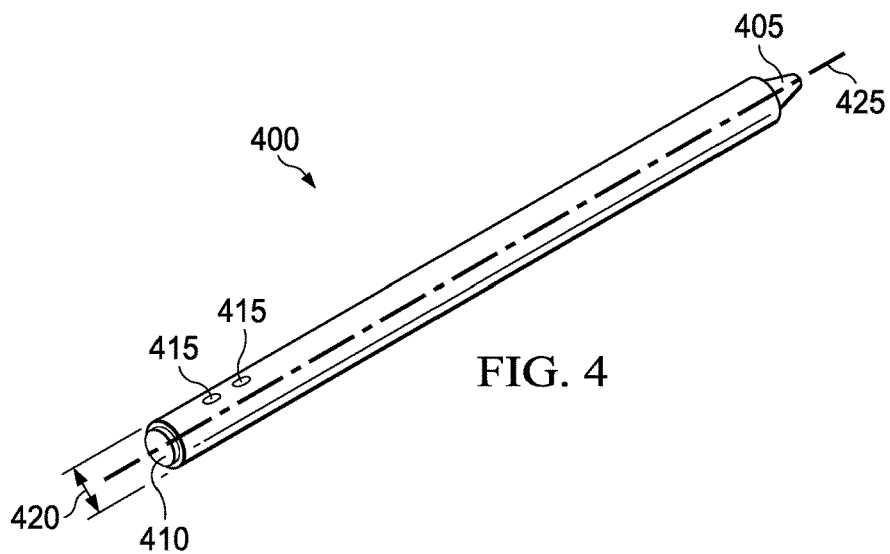
FIG. 4 is an illustration of a pen device according to various embodiments.

FIG. 4 illustrates a pen device 400 according to various embodiments. The pen device 400 may include a tip portion 405 that is designed to interoperate with the touch screen used by the touch-sensitive display of the IHS. In certain embodiments, the tip portion 405 of the pen device 400 may include one or more sensors that collect data during the use of the pen device. For instance, in certain embodiments data collected by sensors in the tip 405 of the pen device 400 is transmitted to the IHS for use by handwriting recognition software programs running on the IHS. In certain embodiments, the body of the pen device 400 may include an inner stylus 410 that is protected by a rubberized or other anti-slip coating. This coating serves to provide an anti-slip gripping surface that facilitates the use of the pen device 400 as a writing tool. The coating of the pen device 400 also provides an anti-slip surface that promotes the pen device 400 remaining securely docked in the pen docking compartment.

The pen device 400 may also include any number of charging contacts 415. As described, the pen device 400 may include various electronic components housed within the inner stylus 410 of the pen device. These electronics internal to the inner stylus 410 may include one or more sensors that collect data regarding the use of the pen device 400 by the user. These internal electronics may also include a wireless transceiver for communicating data to and from the IHS. In order to power these electronics of the pen device 400, the inner stylus 410 may also house one or more batteries that may be charged via the charging contacts 415. The IHS may be configured to provide power to the charging contacts 415 while the pen device 400 is docked in the pen docking compartment in order to charge the batteries of the pen device 400.

In the illustrated embodiment of the pen device 400, the two charging contacts 410 are circular openings in the external coating that provide access to charging surfaces provided by the inner stylus 410. The charging surfaces of the inner stylus 410 are connected to circuitry within the inner stylus 410 that is configured for charging the internal batteries of the pen device 400. Other embodiments may utilize different shapes for the charging contacts 410. In the illustrated embodiment, there are two charging contacts 410 that are oriented along an axis 425 that runs the length of the pen device 400. By utilizing two charging contacts 410, alignment of the pen device 400 within the pen docking compartment of the IHS is promoted. Two charging contacts 410 oriented along the axis 425 of the pen device 400 will correctly mate with corresponding charging surfaces in the pen docking compartment only when the pen device is correctly aligned within the docking compartment. Other embodiments may utilize more than two charging points that are aligned along the long axis of the pen device.

The diameter 420 of the pen device 400 may be selected based on several factors. In order to serve as a multi-purpose writing tool, the diameter 420 of the pen device 400 must provide the user with a comfortable writing experience that is similar to that of a traditional writing tool, such as pen or pencil. The diameter 420 of the pen device 400 must also be large enough to house the internal electronics of the pen device. Based on these constraints, an ideal diameter 420 for a pen device for use by an adult is approximately 9.5 mm. Smaller diameters than 9.5 mm for pen devices are technically feasible, but smaller diameters tend to result in a poor writing experience as writers tend to experience fatigue and are unable to replicate their natural handwriting used with traditional pen and paper.

FIG. 5a is a cutaway view of a pen device 505 docked in a pen docking compartment integrated within a thermal foot 560 of an IHS 500 according to various embodiments. In FIG. 5a, IHS 500 is a laptop computer that has a touch-sensitive display, which is depicted in a closed position. FIG. 5a is a cutaway view from the perspective of the person viewing the laptop computer from the rear of the laptop with the cutaway cross-section taken at approximately the greatest height of the thermal foot 560 relative to the base of the laptop 500. Certain features of the laptop, such a peripheral device connectors, are not displayed. Similar to the thermal foot of 305 of FIGS. 3a-c, the thermal foot 560 extends along the length of the bottom surface of laptop 500 and includes a cavity that has been configured as a pen docking compartment.

FIG. 5b is a different cutaway view of the same laptop 500 as depicted in FIG. 5a. In FIG. 5b, the cross-section is taken approximately across the center of laptop leaving a cutaway view from the perspective a person viewing the laptop from the user's right side. As with FIG. 5a, FIG. 5b also depicts a pen device that is docked in a pen docking compartment of laptop 500. At the point of the illustrated cross-section in FIG. 5b, two portions of the modified thermal foot 565 and 570 remain, with a cavity in between that provides sufficient room for the pen docking compartment. At the point of the cross-section of FIG. 5b and along the length of the pen docking compartment, the two portions of the thermal foot 565 and 570 on each side of the pen docking compartment are unconnected, leaving a cavity in between. As illustrated in FIG. 5a, the unmodified portion of the thermal foot 560 extends from each end of the pen docking compartment. The height of the unmodified portions of the thermal foot 560 is shown in the cross-section of FIG. 5b by the outline 545 of these unmodified portions of the thermal foot. The height of the thermal foot represented by the outline 545 results in an air gap 550 below the base of the laptop 500. This air gap 550 created by the thermal foot 560 is also reflected in FIG. 5a.

As described, pen devices for use with touch-sensitive displays may include tips with sensors or other electronics. In order to protect such tips from damage while stored within the pen docking compartment, certain embodiments may include a portion 515 of the thermal foot 560 that extends over the cavity of the pen docking compartment as illustrated in FIG. 5a. Configured in this manner, the protective overhanging portion 515 of the thermal foot 560 shields the tip 510 of the pen device while it is docked in the pen docking compartment. While the tip portion 510 of the pen device is shielded by the overhang 515 of the thermal foot 560, the body 505 of the pen device remains accessible to the user. Different embodiments may utilize different sizes for this protective overhanging portion 515 of the thermal foot based on the properties of supported pen devices.

As described, a pen device according to embodiments may be comprised of an inner stylus that is covered with a rubber or other anti-slip coating. This anti-slip coating is illustrated in the cross-section of FIG. 5b as ring 560 that encircles the inner stylus 535 of the pen device that is docked in the pen docking compartment. Other embodiments may utilize different relative thicknesses for the anti-slip coating layer 540 relative to the diameter of the inner stylus 535. As provided above, an ideal diameter for a writing utensil is approximately 9.5 mm. This diameter is reflected in FIG. 5b as the diameter of the pen device including both the inner stylus 535 and the anti-slip coating 540. In order to secure the pen device in the pen docking compartment, certain embodiments may utilize a magnetic coupling to secure the pen device.

In the embodiment illustrated in FIGS. 5a-b, the magnetic coupling is generated using a magnet 520 that is a component of the pen device and a metal slug 525 that is a component of the pen docking compartment. In the illustrated embodiment, the magnet 520 lies within the inner stylus 535. In such embodiments, the location of the magnet 520 may be indicated to the user via a mark on the outside of the anti-slip coating 540. Such a marking on the outer surface of the coating 540 assists the user in orienting the pen device within the pen docking compartment in order to facilitate coupling with the metal slug 525 located in the back of the compartment. In other embodiments, a portion of magnet 520 may remain exposed such that the magnet is visible to the user and can be used to guide the user in orienting the magnet of the pen within the pen docking compartment. In certain embodiments, magnet 520 may be a ring magnet that facilitates coupling with the metal slug 525 in all orientations of the pen device within the pen docking compartment. Other embodiments may instead utilize a metallic slug within the pen device and a magnet within the pen docking compartment.

As described in more detail with respect to FIGS. 7a-e, certain embodiments may include a pen ejection mechanism that may be used to eject the pen device from within the pen docking compartment. Such embodiments may include a pen release latch 555 that is accessible from the bottom of the IHS enclosure. By sliding the pen release latch 555, a pen ejector 555 structure that is internal to the enclosure also slides within the pen docking compartment such that the magnetic coupling between the magnet 525 and the metal slug 525 is broken. In certain embodiments and as described in additional detail with respect to FIGS. 7a-e, the pen ejector 555 may include a structure the protrudes into the pen docking compartment in conjunction with the breaking of the magnetic coupling in order to physically eject the pen device from the pen docking compartment.

Figure 6A:
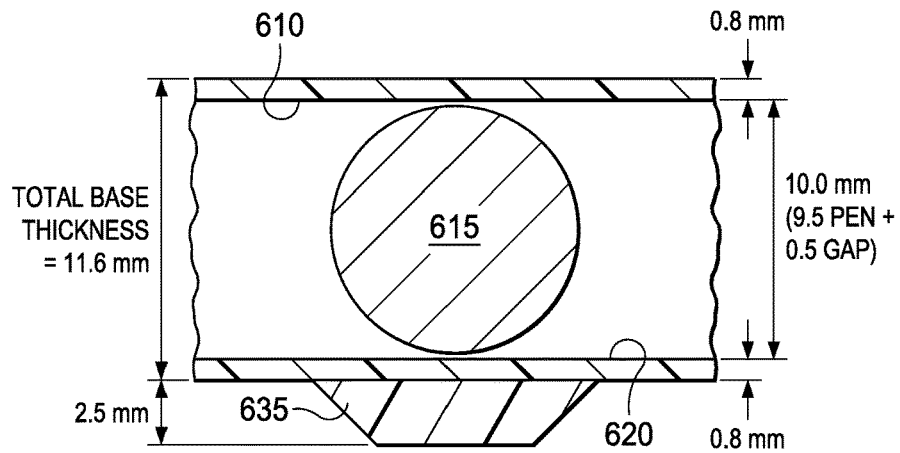
FIG. 6a is an illustration of a cross-section of a pen device stored within an IHS.
Figure 6B:
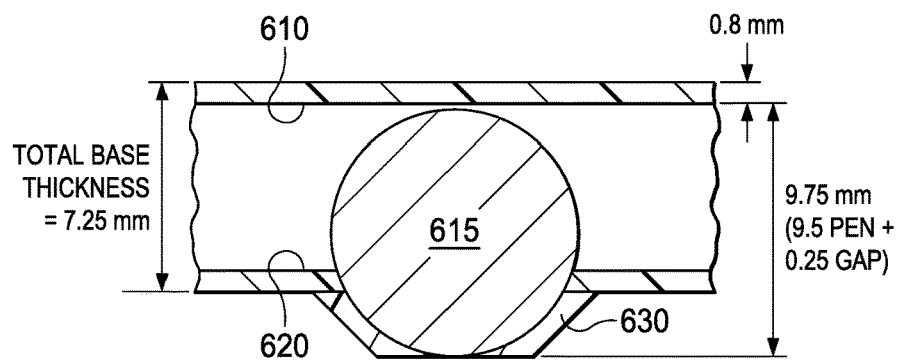
FIG. 6b is a diagram illustrating a cross-section of a pen device stored within an IHS according to various embodiments.

FIGS. 6a-b illustrate one of the advantages provided by described embodiments. As described above, the ideal writing size for a writing tool such as a pen device used with a touch-sensitive display is approximately 9.5 mm. FIG. 6a illustrates a scenario where such a pen device 615 is stored internally to an IHS such as a laptop computer. As described an IHS such as a laptop computer or tablet is encased within a hard case or enclosure. A typical thickness for the walls of such hard case enclosures is 0.8 mm. FIG. 6a shows this thickness of 0.8 mm for both the top surface 610 and the bottom surface 620 of the laptop. To account for storage of the pen device 615 within the enclosure of the laptop formed by the top surface 610 and the bottom surface 620, a 0.25 mm gap is allowed between the pen device 615 and each of the walls 610, 620 of the enclosure. As provided in FIG. 6a, storage of the pen device 615 within the structure of the enclosure defined by walls 610 and 620 results in an overall thickness for the device of at least 11.6 mm.

Modern mobile devices, including laptops and tablets with touch-sensitive screens, can now be manufactured with advertised thicknesses less than 11 mm. In such ultra-thin systems, internal storage of a 9.5 mm pen device is not physically possible. However, as provided above, mobile devices may include thermal foot structures used for elevating the bottom surface of a mobile device off of a work surface and allowing heated air to be vented from underneath the mobile device. As illustrated in FIG. 6a, a typical thermal foot 635 is approximately 2.5 mm in height, thus providing approximately 2.5 mm in clearance below the bottom 620 of enclosure. Structures such as the described thermal feet are not typically included in the advertised thickness of a mobile device. Accordingly, the advertised thickness of the laptop in FIG. 6a would be 11.6 mm and would not include the 2.5 mm thermal foot 635.

FIG. 6b illustrates the advantage provided by storing a pen device 615 at least partially within the thermal foot structure of a laptop. As described with respect to the above embodiments, a pen device 615 may be stored within a pen docking compartment that is formed within a cavity provided within the thermal foot 630 of an IHS, such as a laptop or tablet, with a touch-sensitive display. When stored according to the embodiment of FIG. 6b, the pen device 615 may be stored within an integrated compartment of the laptop while enabling thinner systems. As illustrated in FIG. 6b, the pen device 615 is secured partially within the foot structure 630. Stored in the manner, the thickness of the laptop accounts for the thickness of the top 610 of the enclosure, the diameter of the pen device 615 and a 0.25 mm gap between the pen device 615 and the top of the enclosure 610. As illustrated in FIG. 6b, a pen device 615 with a diameter of 9.5 mm may be stored according to the provided embodiments while still allowing system thicknesses as low as 7.25 mm. Embodiments provide secure docking of a 9.5 mm pen device and do so in a manner that supports ultra-thin systems below 11 mm in thickness.

Figure 7A:
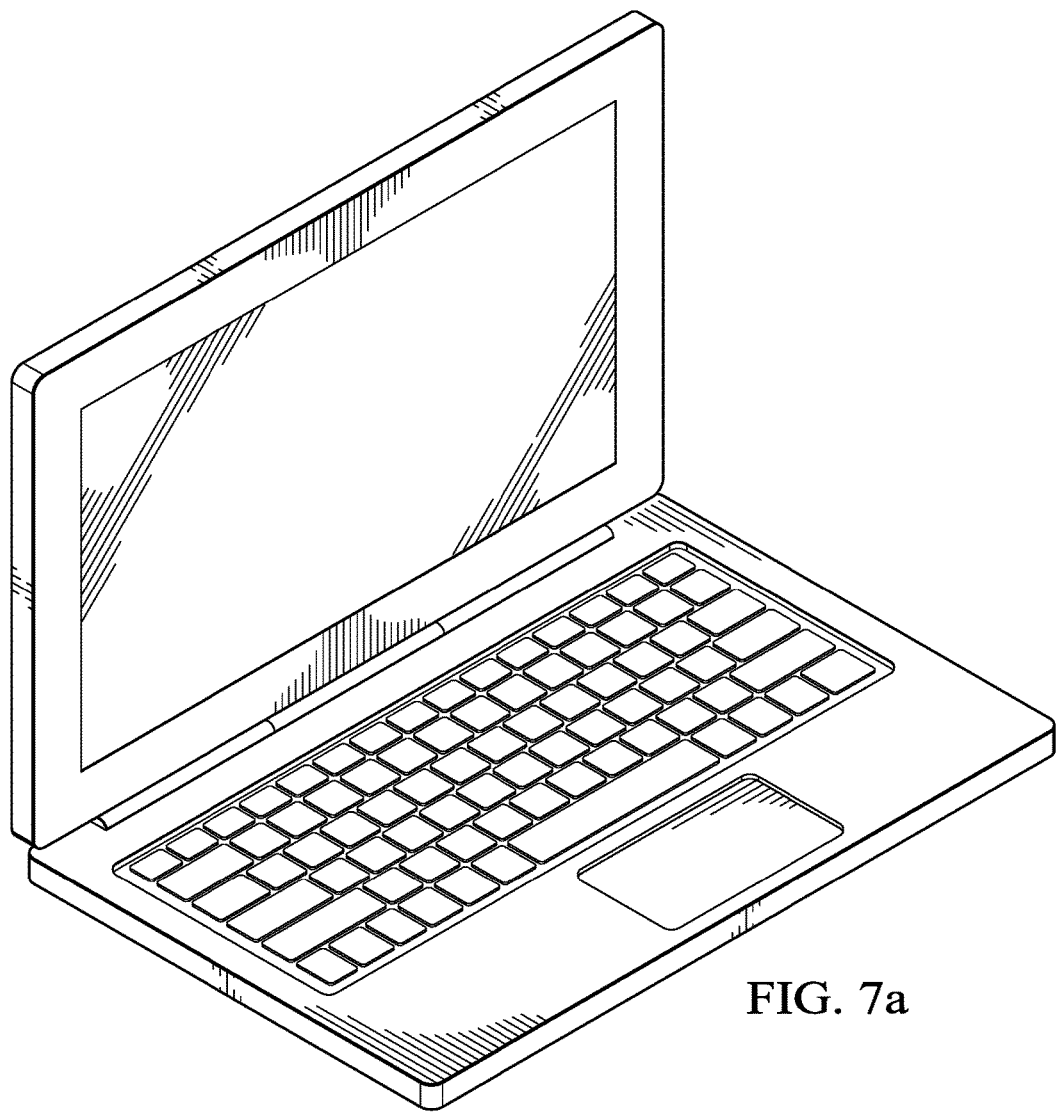
FIG. 7a is an illustration of an IHS according to various embodiments.
Figure 7B:
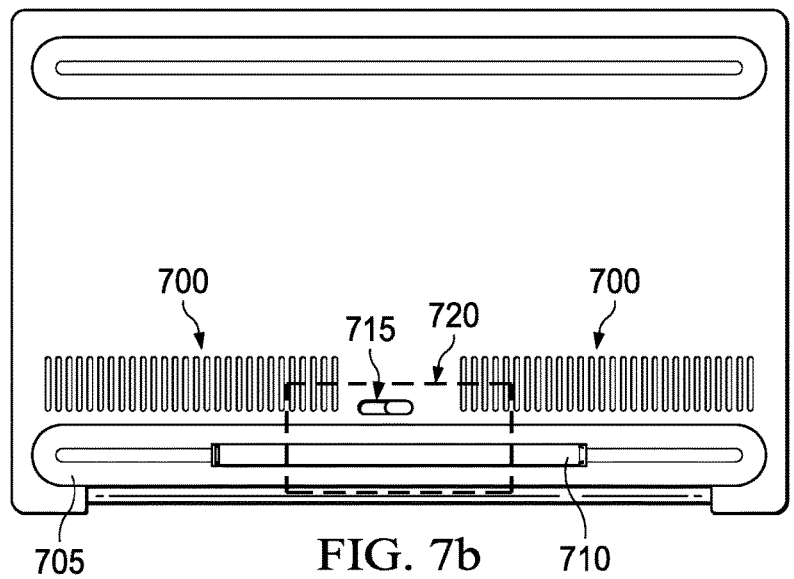

FIGS. 7a-e depict various views of a capability provided according to various embodiments for ejecting a pen device from a pen docking compartment integrated into a thermal foot structure of an IHS as described with respect to the above embodiments. As described above, an IHS according to embodiments may be a laptop computer, such as depicted in FIG. 7a, with a touch-sensitive display that may be operated by the user's fingers or using a stylus such as a pen device. FIG. 7b depicts the bottom side of the laptop computer depicted in FIG. 7a. Similar to the embodiment described with respect to FIGS. 3a-c, the laptop of FIG. 7b includes a thermal foot 705 that runs the length of the bottom of the laptop and serves to elevate the laptop so that heated air can be vented from the inside the laptop via vents 700.

Also depicted in FIG. 7b is a pen device 710 stored in a pen docking compartment that is integrated into the thermal foot of the laptop as described with respect to the above embodiments. As described, the pen device 710 may be secured within the pen docking compartment using a magnetic coupling generated using a magnet and corresponding metal slug. In addition, the pen device 710 may include an anti-slip coating that services to further secure the pen device 710 within the pen docking compartment. Consequently, once secured in the pen docking compartment, the user may require assistance in retrieving the pen device 710. In order to assist the user, the illustrated embodiment includes a release latch 715 that may be used to eject the pen device 710 from the pen docking compartment.

Figure 7C:
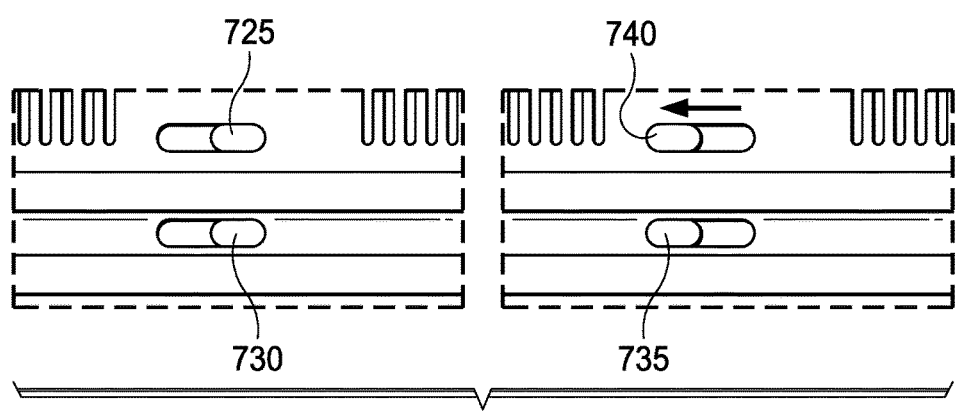
FIG. 7c is an illustration of a pen ejection mechanism provided by an IHS according to various embodiments.

FIG. 7c depicts two closer views of a portion 720 of the bottom surface of the laptop of FIG. 7b. However, in FIG. 7c, the pen device is no longer in the pen docking compartment. Without the pen device present, the bottom of the pen storage compartment is visible in FIG. 7c. In particular, an ejection tab 730, 735 can be seen in the bottom of the pen docking compartment. In the close up views of FIG. 7c, the release latch is shown in a first position 725. The user may eject the pen device from the pen docking compartment by sliding the release latch to a second position 740, in this case by sliding the release latch to the left in the direction of the depicted arrow. By sliding the release latch from the first position 725 to the second position 740, the ejection tab is likewise moved from a first position 730 to a second position. The ejection tab is designed with a sloped upper surface that faces into the pen docking compartment. Moving this ejection tab from the first position 730 to the second position 735 results in the sloped surface of the ejection tab protruding into the pen docking compartment and dislodging the pen device from its stored position. As described, the pen device may be secured within the pen docking compartment via a magnetic coupling. In such embodiments, the ejection tab is designed to generate sufficient ejection force to break the magnetic coupling that holds the pen device in place within the pen docking compartment.

Figure 7D:
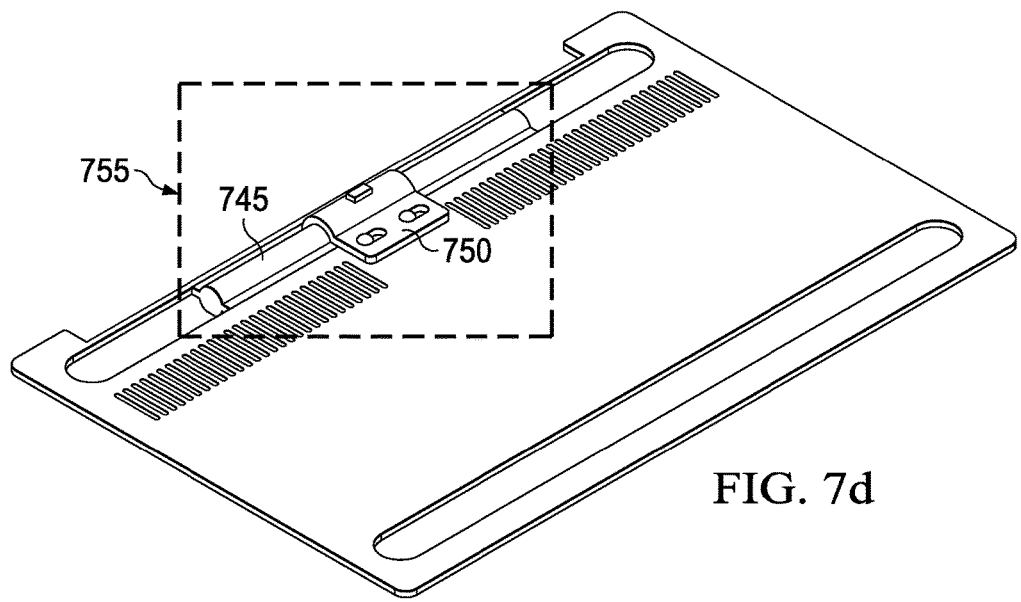
FIG. 7d is another illustration of the pen ejection mechanism of FIG. 7c.

FIG. 7d depicts the opposite side of the laptop bottom that is depicted in FIG. 7b. Whereas FIG. 7b illustrates the external side of the bottom of the laptop enclosure, FIG. 7d illustrates the internal side of the bottom of the laptop enclosure, thus providing the perspective of the pen ejection mechanism from the inside of the laptop base. Accordingly, FIG. 7d depicts the internal pen ejector 765 that includes the pen release latch 725, 740 and the ejection tab 730, 735. The pen release latch 725, 740 protrudes from the internal pen ejector 765. 765 into an opening provided in the bottom of the laptop enclosure allowing manipulation of the release latch 725,740. The ejection tab 730, 735 protrudes from the internal pen ejector 765 into an opening in the pen docking compartment. By moving the pen release latch 725, 740, the internal pen ejector 765 is also moved as shown by the arrow in FIG. 7e. Via this motion of the internal pen ejector 765, the ejection tab 730, 735 is likewise moved within the pen docking compartment, thus ejecting the pen device.

Figure 7E:
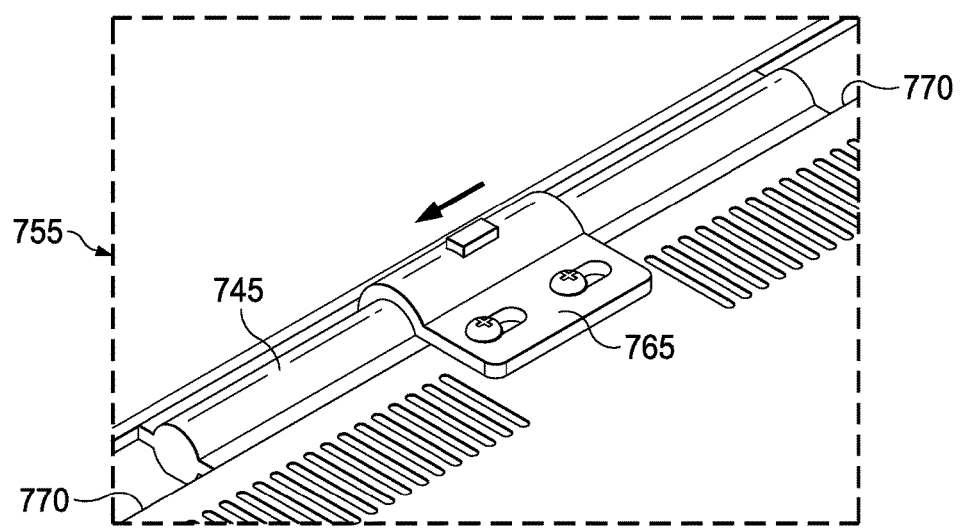
FIG. 7e is another illustration of the pen ejection mechanism of FIG. 7c.

FIG. 7d also depicts a portion of a cylinder 745 that forms the cavity for the pen docking compartment within the thermal foot of the laptop. The cylinder portion 745 may be formed directly as a part of the enclosure of the laptop or may be separately formed and attached to the enclosure within the cavity provided within the thermal foot 770 of the laptop. From the perspective from inside the laptop base that is illustrated in FIG. 7e, the thermal foot 770 is a cavity that extends the length of the enclosure. An opening in the thermal foot 700 is closed off using the cylinder portion 745 to form the pen docking compartment integrated within the structure of the thermal foot 770.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system, comprising:
    a pen device; and
    an Information Handling System (IHS) enclosure comprising a thermal foot that protrudes from the bottom of the IHS enclosure and creates an air gap that allows heated air to escape from vents underneath the IHS enclosure, wherein the thermal foot comprises a cavity that includes a compartment for docking the pen device.

2. The system of claim 1, wherein the pen device comprises a battery and further comprises one or more sensors that are powered by the battery.

3. The system of claim 2, wherein the pen docking compartment includes one or more charging contacts that interface with corresponding charging contacts on the surface of the pen device in order to charge the battery.

4. The system of claim 1, wherein the pen device is approximately 9.5 mm in diameter.

5. The system of claim 4, wherein the advertised thickness of the IHS is less than or equal to 11 mm.

6. The system of claim 1, wherein the pen device is secured within the pen docking compartment via a magnet coupling.

7. The system of claim 6, wherein the magnet coupling is generated by a magnet located within the pen device and a metal slug located within the pen docking compartment.

8. The system of claim 1, wherein the thermal foot maintains an air gap underneath the IHS.

9. The system of claim 1, wherein the thermal foot obscures a portion of the pen docking compartment such that the tip of the pen device is covered when docked in the pen docking compartment.

10. An Information Handling System (IHS), comprising:
    an enclosure; and
    a thermal foot coupled to the enclosure, wherein the thermal foot protrudes from the bottom of the enclosure and creates an air gap that allows heated air to escape from vents underneath the enclosure, and wherein the thermal foot comprises a cavity that includes a compartment for docking the pen device.

11. The IHS of claim 10, wherein the pen device comprises a battery and wherein the pen docking compartment includes one or more charging contacts that interface with corresponding charging contacts on the surface of the pen device in order to charge the battery.

12. The IHS of claim 10, wherein the pen device is approximately 9.5 mm in diameter and wherein the advertised thickness of the IHS is less than or equal to 11 mm.

13. The IHS of claim 10, wherein the pen device is secured within the pen docking compartment via a magnet coupling generated by a magnet located within the pen device and a metal slug located within the pen docking compartment.

14. The IHS of claim 10, wherein the thermal foot maintains an air gap underneath the IHS.

15. The IHS of claim 10, wherein the thermal foot obscures a portion of the pen docking compartment such that the tip of the pen device is covered when docked in the pen docking compartment.

16. A pen device, comprising:
    a battery;
    one or more sensors powered by the battery; and
    one or more charging contacts on the surface of the pen device, wherein the charging contacts interface with corresponding charging contacts provided within a cavity of a thermal foot coupled to an enclosure of an Information Handling System (IHS), wherein the thermal foot protrudes from the bottom of the enclosure and creates an air gap that allows heated air to escape from vents underneath the enclosure, and wherein the thermal foot comprises a cavity that includes a compartment for docking the pen device.

17. The pen device of claim 16, wherein the pen device is approximately 9.5 mm in diameter.

18. The pen device of claim 17, wherein the advertised thickness of the IHS is less than or equal to 11 mm.

19. The pen device of claim 16, further comprising a magnet for magnetically coupling the pen device within the pen docking compartment.

20. The pen device of claim 19, wherein the magnet coupling is generated between the magnet located within the pen device and a metal slug located within the pen docking compartment.

* * * * *